(No Model.) 7 Sheets—Sheet 1.

G. WESTINGHOUSE, Jr.
DRAW GEAR APPARATUS FOR CARS.

No. 499,336. Patented June 13, 1893.

WITNESSES:
T. J. Hogan.
F. E. Gaither

INVENTOR,
George Westinghouse Jr.
by George H. Christy
Att'y.

(No Model.) 7 Sheets—Sheet 2.

G. WESTINGHOUSE, Jr.
DRAW GEAR APPARATUS FOR CARS.

No. 499,336. Patented June 13, 1893.

WITNESSES:
T. J. Hogan.
F. E. Gaither

INVENTOR,
George Westinghouse Jr.
by George H. Christy
Att'y (No Model.)  7 Sheets—Sheet 3.

G. WESTINGHOUSE, Jr.
DRAW GEAR APPARATUS FOR CARS.

No. 499,336. Patented June 13, 1893.

FIG. 3.

WITNESSES:
T. J. Hogan.
F. E. Gaither.

INVENTOR,
George Westinghouse Jr
by George H. Christy
Att'y.

(No Model.)  7 Sheets—Sheet 5.

G. WESTINGHOUSE, Jr.
DRAW GEAR APPARATUS FOR CARS.

No. 499,336.  Patented June 13, 1893.

WITNESSES:
T. J. Hogan.
F. E. Gaither.

INVENTOR,
George Westinghouse Jr.
by George H. Christy
Att'y.

(No Model.)  7 Sheets—Sheet 6.

G. WESTINGHOUSE, Jr.
DRAW GEAR APPARATUS FOR CARS.

No. 499,336. Patented June 13, 1893.

FIG. 10.

WITNESSES:
T. J. Hogan.
F. E. Gaither.

INVENTOR,
George Westinghouse Jr
by George H. Christy
Att'y (No Model.)  G. WESTINGHOUSE, Jr.  7 Sheets—Sheet 7.
DRAW GEAR APPARATUS FOR CARS.

No. 499,336. Patented June 13, 1893.

UNITED STATES PATENT OFFICE.

GEORGE WESTINGHOUSE, JR., OF PITTSBURG, PENNSYLVANIA.

DRAW-GEAR APPARATUS FOR CARS.

SPECIFICATION forming part of Letters Patent No. 499,336, dated June 13, 1893.

Application filed December 8, 1891. Serial No. 414,376. (No model.)

*To all whom it may concern:*

Be it known that I, GEORGE WESTINGHOUSE, Jr., a citizen of the United States, residing at Pittsburg, in the county of Allegheny and State of Pennsylvania, have invented or discovered a certain new and useful Improvement in Draw-Gear Apparatus, of which improvement the following is a specification.

In Letters Patent No. 391,997, granted to me October 30, 1888, and in an application for patent, now pending, filed by me April 11, 1891, Serial No. 388,528, I have shown, described, and claimed certain improvements in draw gear and buffing apparatus, in which I employ friction devices for absorbing momentum and modifying the shocks of draft and buffing; and the object of my present invention is to further improve my said draw gear and buffing apparatus and also to provide a new and improved construction and arrangement of parts which may be employed with the ordinary forms of draw gear.

To this end, my invention consists in certain novel devices and combinations by the employment of which the number of parts is diminished and the draw gear and the parts necessary for its attachment to the car are embodied in a single compact structure of great strength, and which may be quickly and easily attached to or removed from the car.

The improvement claimed is hereinafter fully set forth.

In the accompanying drawings: Fig. 4ª, a transverse section at the line $z$, $z$, of Fig. 4.

My present improvement is specially adapted for use with the improved friction buffer and draw gear of my patent and pending application before referred to; but may be used with any of the ordinary well known forms of draw gear.

As shown in the drawings it consists of a structure for inclosing and containing the draw gear and buffing apparatus and for receiving and resisting, as a whole, the shocks of draft and buffing, and which includes within itself, or as a part of itself, all of the necessary members of the draw gear and buffing apparatus in readiness to be secured to the car body, and which takes the place of a number of separate and unconnected parts employed in the ordinary application of draw gear to a car. It forms a complete casing for the draw gear, within which all of the parts of the draw gear may be assembled; and when so assembled, and the parts of the casing connected together, a single structure is formed which may be handled or moved about without disarranging any of the parts. In this form the device may be quickly and easily applied to any car by merely bolting it in place to the timbers of the car. When secured in place it receives and resists, as a whole, the shocks transmitted to it by the draw gear or the impact of the cars, and when so secured it greatly strengthens the car itself by binding the timbers together by a strong stiff connection, thus forming a strong rigidly connected structure which as a whole receives the shocks which in other forms of draw gear apparatus are received by separate detached parts. It forms a supporting and inclosing frame for the draw gear and buffing apparatus and consists of three main parts, one of which, for convenience of description, I will refer to as the buffer iron. The other two form the sides for supporting and guiding the draw gear and buffing apparatus and will be referred to as side or channel bars.

In Figs. 1, 2, 3, 4, and 9, I have illustrated my improvement as applied in connection with a frictional draft and buffing apparatus of the type exemplified in my patent and pending application aforesaid.

The draw bar 1, shown in the several figures, is of the standard form but any other preferred form may be used. The draft pin 2 has a head 3 formed on one of its ends, which bears against a shoulder on the inside of the inner end of the draw bar, and at the opposite or inner end of the draft pin, 2, a key 4, fits in a slot in the pin and is secured by a pin or split ring 5. The initial spring 6, springs 7 and 8, wedge block 9, plate carrier 10, housing 11, plates 12 and 13, and yoke 14, are substantially similar to the corresponding parts shown in my pending application aforesaid except that instead of connecting the two parts of the plate carrier, 10, by means of bolts at the edges, they are not connected but have lugs, 22, formed on their sides which are in contact with and guided by flanges 28 and 29, formed on the inner side of the channel bars 15, to be presently described.

Figures 1, 6, 7:
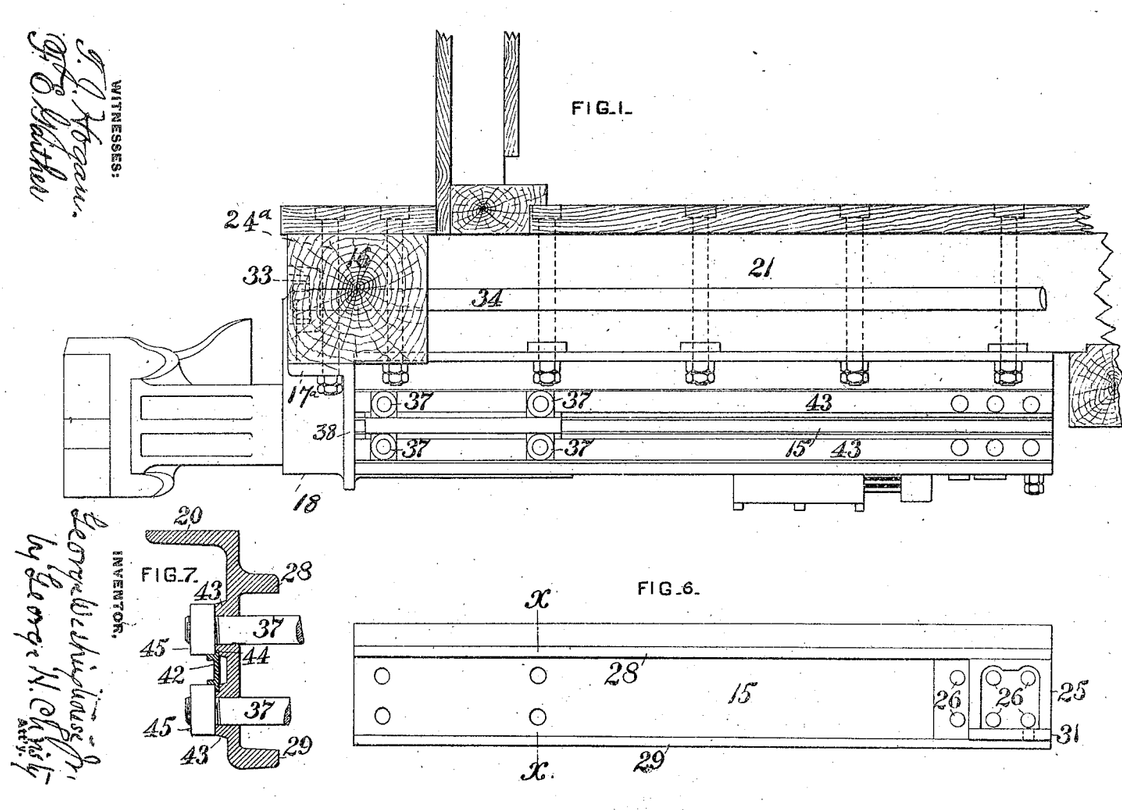
Figure 1 is a side elevation illustrating my invention attached to a car, the end of the car being shown in section.
Fig. 6, a side elevation, showing the inner side of one of the side or channel bars.
Fig. 7, a cross section, on an enlarged scale through one of the channel bars on the line $x$, $x$, of Fig. 6.
Figure 2:
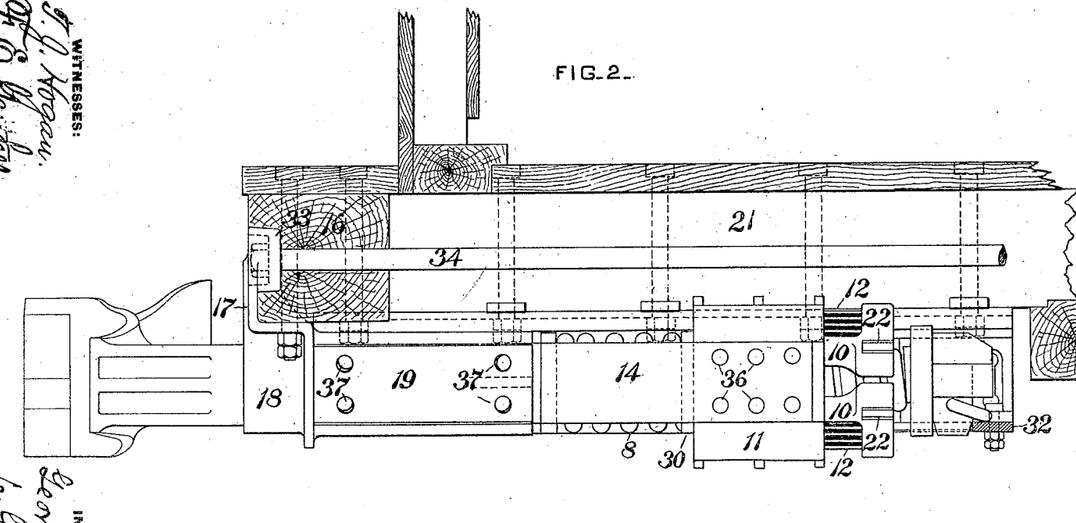
Fig. 2, a similar view with one of the side bars removed.
Figure 3:
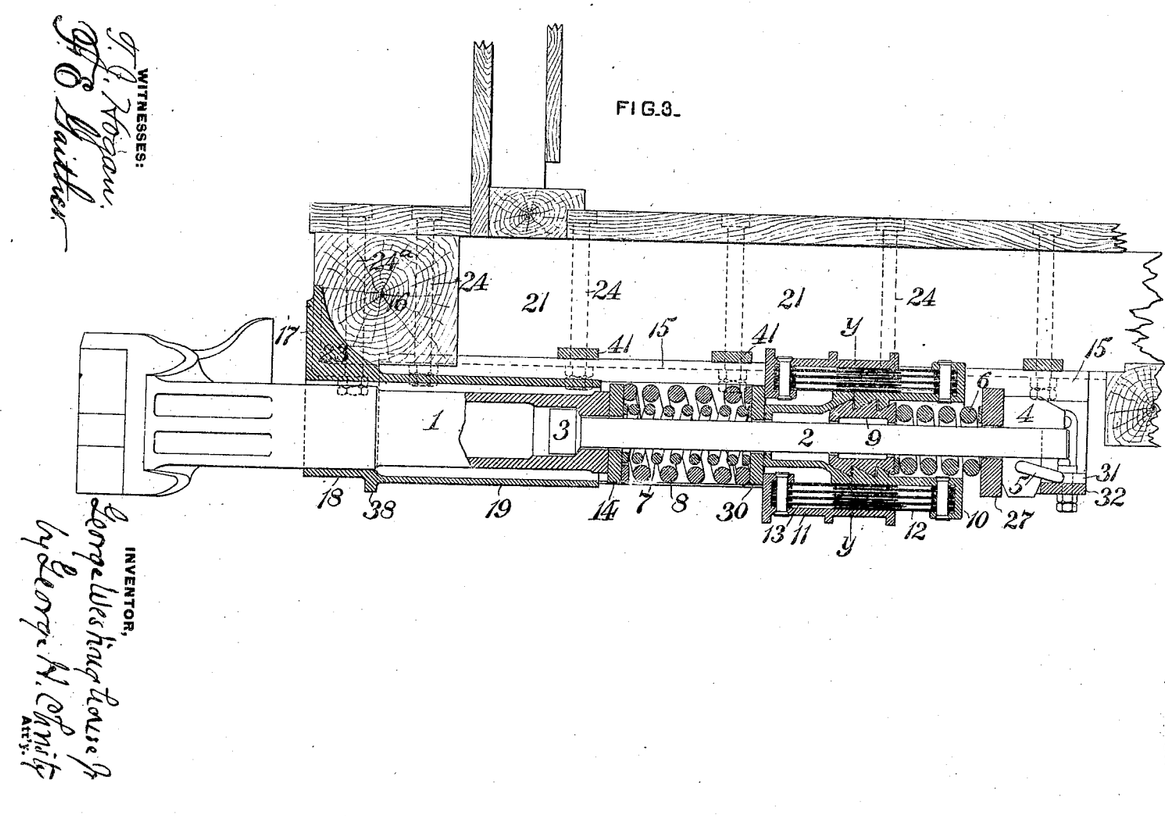
Fig. 3, a vertical longitudinal section of a portion of the end of a car with the draw gear attached thereto.
Figure 4:
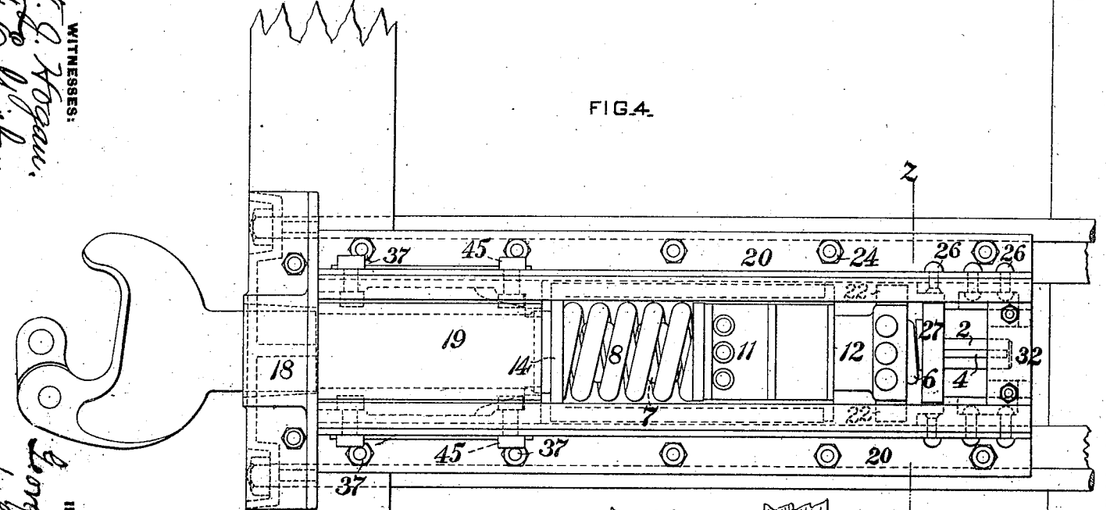
Fig. 4, an inverted plan view of my invention, attached to the bottom of a car.
Figure 4A:
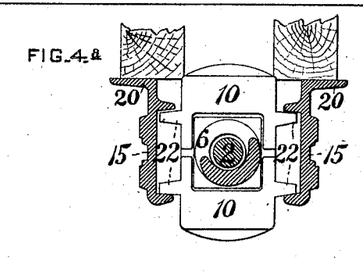
Figures 5, 8, 9:
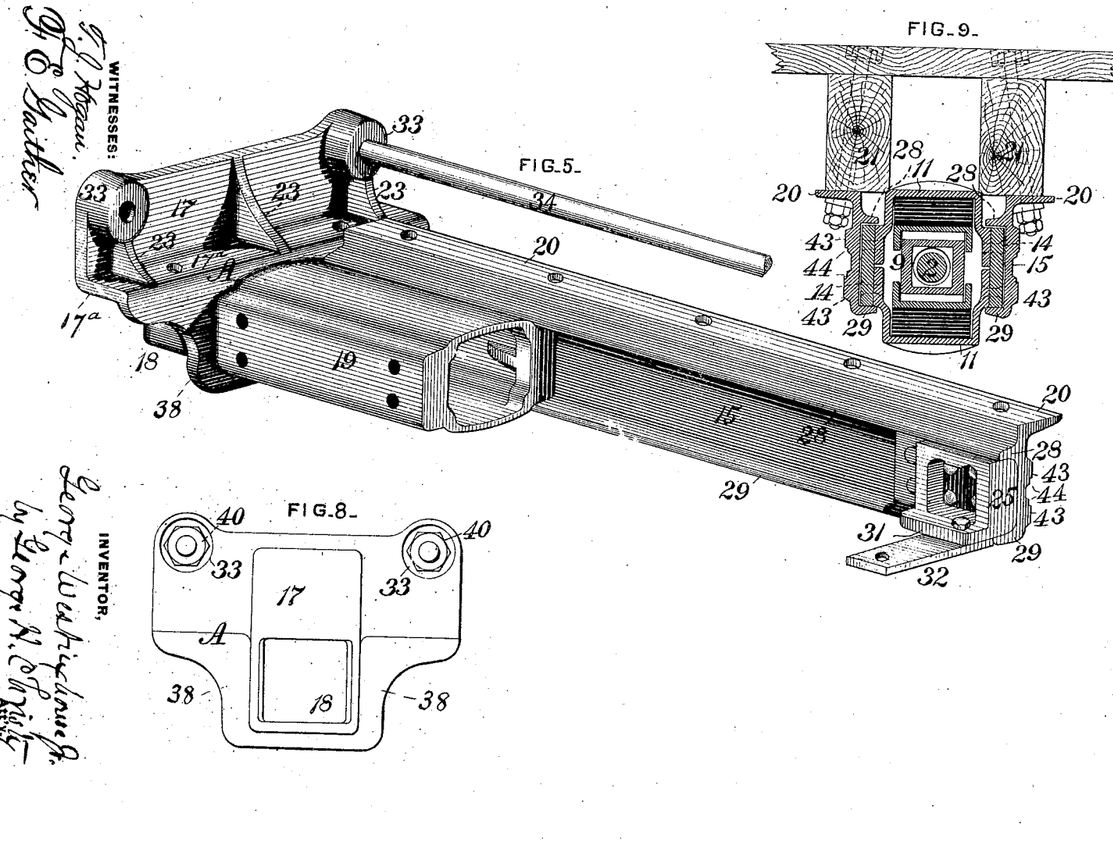
Fig. 5, a perspective view showing the buffing iron and one of the side bars.
Fig. 8, an end elevation of the striking plate and draw bar support.
Fig. 9, a transverse section on the line $y$, $y$, of Fig. 3.
Figure 10:
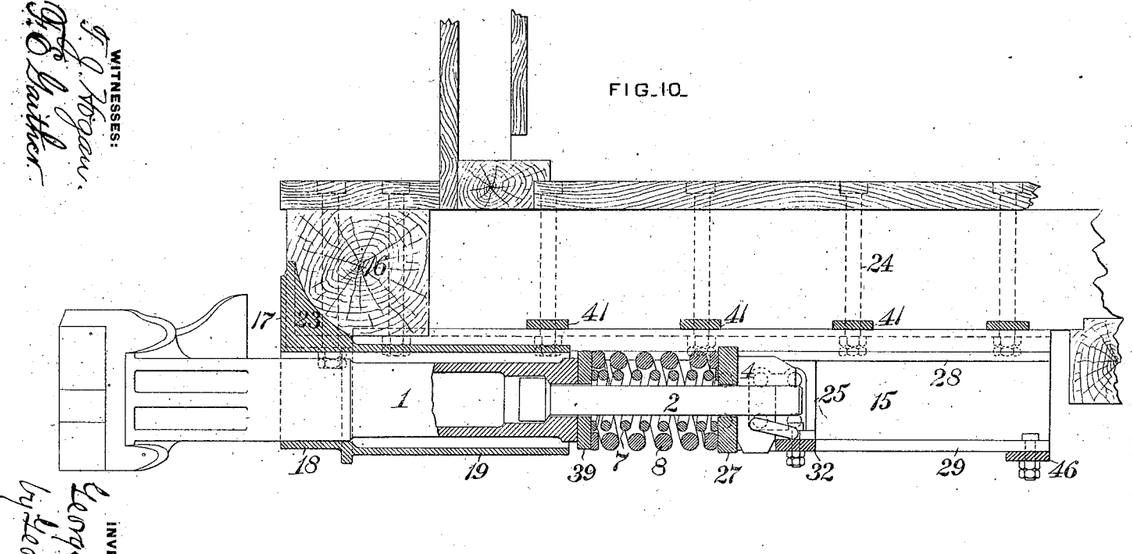
Fig. 10, a vertical longitudinal section, with the friction plates omitted.
Figure 11:
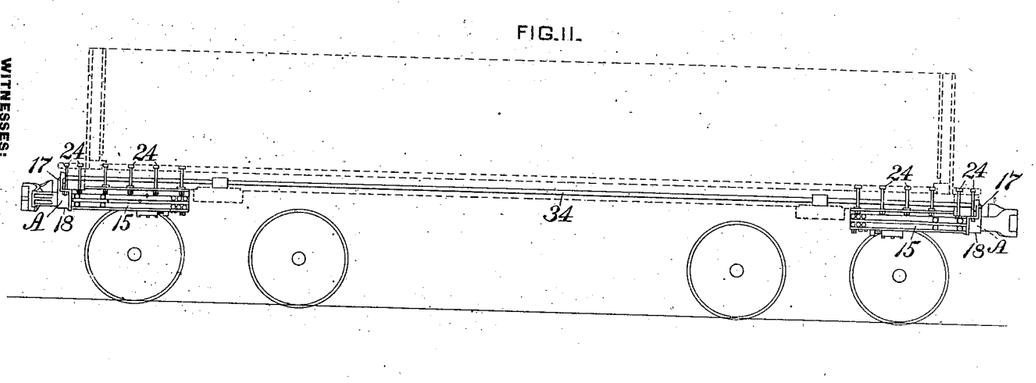
Fig. 11, a side elevation showing my improvement attached to the two ends of a car and connected by a straight rod 34.
Figure 12:
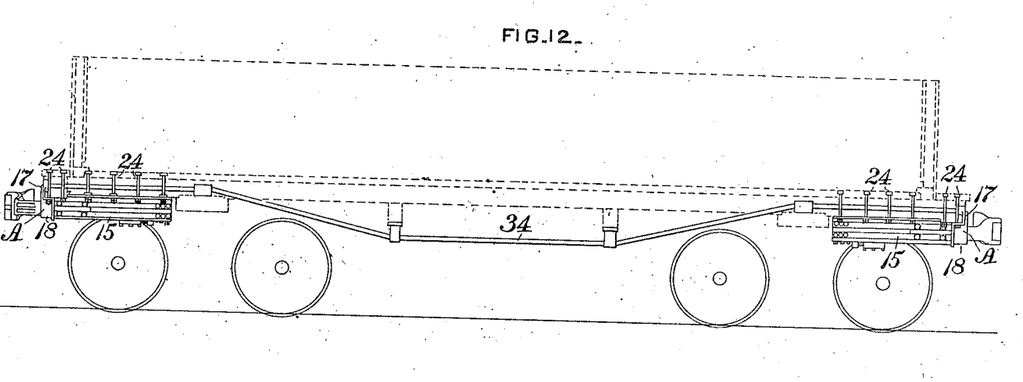
Fig. 12, a similar view showing my improvement applied to the two ends of a car and the rods 34 employed as truss rods.

Fitted to the end sill, 16, of the car, is a metal structure A, preferably a steel casting, which I will term descriptively, the buffer iron, and which includes the striking plate 17, support 18, which serves the purpose of the usual draw bar stirrup, and an extension, 19, which serves as a housing and guide for the draw bar, and the end of which forms a stop for the yoke 14 or for the follower plate, 39, shown in Fig. 10.

On each side of the extension, 19, of the buffer iron A, is bolted a side or channel plate 15, the outer end of which abuts against the flange 38, on the buffer iron. It is preferably made of rolled steel and formed with a flange 20 on the upper edge, with bolt holes through the flange for bolting the channel plates to the end sills, 16, and draft timbers, 21, by means of the bolts 24. The channel plates 15 have inwardly projecting flanges 28 and 29, formed on them between which the extension, 19, fits, and which serve as strengthening ribs for the channel bars, and as guides for the follower plates 27 and 30, and also as guides for the lugs 22 formed on the plate carriers 10.

At the inner ends of the channel plates 15, and between the flanges 28 and 29, are secured back blocks 25 preferably by rivets 26. These back blocks act as stops for the follower plate 27 and serve to receive and transmit to the channel bars the thrust of the follower plate. The back blocks have a flange or lug 31, on their lower sides which forms a shoulder with the edge of the flange 29 on the channel bar. Fitted between the flanges 29 and bolted to the flanges 31, are connecting bars, 32, for binding the ends of the opposite channel plates together.

The striking plate, 17, bears on or embraces the front and lower sides of the end sill 16, and is strengthened by the ribs 23 and may have sockets 33 formed therein to receive the heads or nuts of the bolts 34 which may be the ordinary truss rods of the car, or bolts specially provided extending from end to end of the car, said bolts serving to tie the buffer irons and end sills together, thus utilizing the bolts for continuous draw bar purposes. The portion 17ª of the striking plate is secured to the end sill, 16, by bolts 24ª.

The parts are assembled by first bringing together, in their proper relative positions, the wedge block 9 and the plate carrier 10, and housing 11, with their interlapping plates; the yoke 14 having been first riveted to the housing 11 by the rivets 36. The springs 7 and 8 and the follower plate 30 are then placed between the end of the yoke 14 and the end of the housing 11 and the spring 6 and follower plate 27 in rear of the wedge block 9. These parts are placed in their proper positions relatively to the extension, 19, of the buffer iron A to which one of the channel bars 15 has been previously secured by the bolts 37. The second channel plate is then bolted to the opposite side of the extension 19; and the inner ends of the channel plates, to which the back blocks 25 have been riveted, are connected together by bolting the bar 32 to the flanges 31 of the back blocks. The whole device as above assembled, is now in condition to be handled as one piece, and may be applied to a car by means of the bolts 24 which pass through the flanges 20 of the channel plates, and through the buffer iron A, and serve to secure them to the draft timbers and to the end sill of the car. After attachment to the car, the draw bar 1 and draft pin 2 are put in place and secured by means of the key 4 and ring 5.

As before stated, the plate carriers, 10, in my present construction, are not connected together as in my pending application, before referred to, but are provided with outwardly projecting lugs 22, which move between the guide flanges 28 and 29 of the channel plates 15, so that the upper side of the upper lug bears against the lower side of the flange 28, and the lower side of the lower lug bears on the upper side of the flange 29. The springs 6, 7, and 8 and the friction plates 12 and 13 operate as described in my aforesaid pending application, so that the inward movement of the draw bar forces the follower plate 27 against the back block 25 and the pressure is transferred to the channel plates 15 and the buffer iron A and from these members to the draft timbers 21 and the end sill 16 to which they are secured by the bolts 24. It will be seen that the shocks of draft and buffing are thus taken up by one solid structure, which has been formed by the combination of my draw gear frame with the draft timbers and end sill of the car, instead of being concentrated at some comparatively weak point in the car framing. When the shock is also received directly by the striking plate, 17 of the buffer iron, it is taken up in the same way and resisted by the same rigid structure. It will also be seen that in this respect my improvement differs from all others, for the reason that my draw gear frame does not act merely as a strap connecting different parts together, but also as a stiffening and strengthening accessory to the car frame, adapted to offer great resistance to the shocks incident to practical service. When the draw bar is moved outwardly, the pressure of the draw gear apparatus is transferred to the end of the extension 19 of the buffer iron, which then serves as a front block or stop, and transfers this pressure to the channel bars, draft timbers, end sills, and striking plate, and by means of the rods 34, when the same are employed to the same parts at the opposite end of the car, by which a part of the strain is transferred into a push on the rear end of the car.

In order to form a more effective bearing by which to transfer the strain from the channel plates to the draft timbers, cross bars 41 may be let into the bottom edges of the draft timbers to extend across from one draft timber and channel plate to the other, holes being formed in the ends of the bars 41 for the passage of the bolts 24.

In order to strengthen the channel plates 15 without unduly increasing their weight, ribs, 43, may be formed on them, but I do not wish to limit myself to any particular form of this stiffening rib, and may construct the channel bar with one or more such thickened portions. As shown in the drawings there are two of them with an intermediate depression.

In order to prevent the nuts 45 on the bolts 37 from jarring loose, a rabbet or groove, 44, may be formed on the adjacent edges of the ribs 43 to receive a thin strip of metal 42 which fits between the nuts, 45, and has a tongue on its opposite edges which fits under the nuts and into the rabbet. This strip can be inserted from the rear and have its outer end battered over to prevent it from working out.

In Fig. 10 of the drawings I have shown my draw gear frame in connection with an ordinary draw gear apparatus in which friction devices are not employed. The usual springs 7 and 8 are located between the follower plates 27 and 39 which are supported at their ends between the flanges 28 and 29 of the channel bars 15. The front follower plate 39 bears against the inner end of the draw bar, 1, and when the draw bar is pulled outwardly it bears against the end of the extension 19 of the buffer iron 35. When the springs are compressed by the inward movement of the draw bar, the follower plate 27 bears against the back blocks 25 which, with this form of apparatus, are placed some distance from the end of the channel bars instead of at the ends as with my improved frictional draw gear. The back blocks 25, are connected together, as in the construction first described, by the connecting bar, 32, and another, 46, is bolted to the flanges 29 at the inner end of the channel bars.

It will be seen that my improvement may be used with any form of draw gear and that one form may be changed for the other.

In Fig. 10, as in the other figures, I have shown the standard form of draw bar and coupler but it will be obvious that the ordinary link coupler and draw bar may be used.

It is obvious that the extension 19 may be increased or lessened in length, more or less, without any substantial departure from the present invention; and it will also be seen that as it is lessened in length, the striking plate and stirrup will gradually take on more and more of the charcter or function of a stop or abutment for receiving the forward movement or thrust of the draw gear. This function of a buffer plate or buffer iron, whereby either directly or through a rearward extension, it should act as an abutment to the draw gear, I believe to be new.

My improved structure, as adapted for application to a car body, and so that when applied to such car body, it will include all the essential elements of a draft mechanism and a buffer mechanism, contains in its preferred form the following features, which, in such an organization, and for such use, I believe to be novel,—that is to say, first, a striking plate which shall stand up in front of the end sill of the car, so as to receive the impact or blow sometimes experienced when, from lack of care or otherwise, the cars are violently brought together; second, rigid therewith, a stirrup through which the draw bar may pass back and forth and be properly supported, whether on the car or not; third, also rigid with the striking plate and stirrup, is a rearward extension herein lettered 19, the primary function of which is to act as a housing for the outer end or portion of the draw bar mechanism, or more especially for so much thereof as does not include those parts which have a motion of their own relative to each other, such as the springs, intercalating plates, &c.; fourth, side channel bars, herein marked 15, one on each side of the housing 19, and extending back beyond the rear end of such housing sufficiently far, and at suitable distance from each other, so as to admit of the convenient insertion between them of those parts of the draft mechanisms which have a motion with reference to each other, and so that such draft mechanism in thus moving, shall be guided and held in place by such channel bars, and by the rear connections thereof, and such channel bars having the further feature that they shall extend well up to or toward the striking plate or stirrup box, be capable of being securely fastened at their forward ends one on each side of the housing 19, and at their rear ends by interposed blocks or abutments and cross straps, as at 32, or by like means, and, also, having the capacity, say by a flange such as indicated at 20, whereby the entire structure may be permanently secured to the bottom sills of the car. And in the structure thus defined, it is important to note that all parts of the operative mechanism are amply provided for so as to be kept in place whether in or out of operation, and before being applied to the car, as well as afterward. And so far as my knowledge goes, no single structure has been devised previous to the date of my invention, in which and by which this result could be secured. And being the first to accomplish it, I include herein, the mechanical equivalents and substitutes for the devices specified in the following claims.

I claim as my invention and desire to secure by Letters Patent—

1. The combination with the end timbers of a car, of a rigid frame inclosing the draft or buffing apparatus and serving as a guide and support for the yielding parts of the apparatus and for the outer end of the draw bar, said frame being secured to the draft timbers and end sill of the car, substantially as set forth.

2. The combination, with a draft or buffing apparatus, of a buffer iron, which comprises an integral striking plate and draw bar support, and stop for limiting the outer movement of the buffing apparatus and guide bars rigidly connected to the buffer iron and adapted to guide and support the yielding parts of the apparatus and receive the thrust of the draw bar, substantially as set forth.

3. The combination with the end sill at each end of a car of a striking plate and a draw bar support formed integral therewith, said striking plates being connected together by rods passing through them and extending from end to end of a car whereby the pull on the draw bar at either end is transmitted by the draw bar support and striking plate at one end through the rods to the other end of the car substantially as set forth.

4. The combination in a frame for a draft or buffing apparatus, of a buffer iron comprising a striking plate and a draw bar stirrup or support formed integral with each other, an extension of the buffer iron which forms a stop for limiting the outer movements of the buffing apparatus and side bars rigidly connected to the striking plate and draw bar stirrup and having flanges formed on them for guiding the yielding parts of the apparatus, substantially as set forth.

5. The combination, in a single structure, of a guide and support for the yielding parts of a draft or buffing apparatus, a support or stirrup for the outer end of the draw bar and a striking plate, all rigidly connected together and adapted to be secured to a car, substantially as set forth.

6. In a frame for a draft or buffing apparatus, a buffer iron including in a single structure, a striking plate to protect the end sill of the car, a stirrup to support the draw bar, and an abutment to receive the longitudinal outward thrust of the apparatus, substantially as set forth.

7. The combination of a frame for draft or buffing apparatus having flanges or guides thereon, a friction apparatus having interlapping friction plates, carriers to which the plates are secured, and lugs or projections formed on the carriers and which are guided by the flanges or guides on the frame, substantially as set forth.

8. A draw bar and buffer frame having combined or united in one structure, a striking plate to protect the end sill of the car, a stirrup and housing for carrying and supporting the outer or forward end of the draw gear, two channel bars rigidly secured at their forward ends to such housing, one on each side thereof, extending back a sufficient distance whereby, with the addition of an interposed stop block or blocks, to provide an inclosure within which those parts of the draw gear which have a motion with reference to each other, may be inclosed and retained in place, as well before as after application to the car, substantially as set forth.

9. A draw bar and buffer frame having combined or united in one structure, a striking plate to protect the end sill of the car, a stirrup and housing for carrying and supporting the outer or forward end of the draw gear, two channel bars rigidly secured at their forward ends to such housing, one on each side thereof, extending back a sufficient distance whereby, with the addition of an interposed stop block or blocks, and transverse rear connections, to provide an inclosure within which those parts of the draw gear which have a motion with reference to each other, may be inclosed and retained in place, as well before as after application to the car, substantially as set forth.

In testimony whereof I have hereunto set my hand.

GEO. WESTINGHOUSE, Jr.

Witnesses:
J. SNOWDEN BELL,
W. B. CORWIN.